US012690599B1

(12) United States Patent
Leinbach

(10) Patent No.: US 12,690,599 B1
(45) Date of Patent: Jul. 28, 2026

(54) FOOD VACUUM SEALING CABINET

(71) Applicant: David Leinbach, Hudson, FL (US)

(72) Inventor: David Leinbach, Hudson, FL (US)

( * ) Notice: Subject to any disclaimer, the term of this patent is extended or adjusted under 35 U.S.C. 154(b) by 0 days.

(21) Appl. No.: 19/097,943

(22) Filed: Apr. 2, 2025

(51) Int. Cl.
| | |
|---|---|
| *A23B 2/00* | (2025.01) |
| *A47B 77/08* | (2006.01) |
| *B65D 81/20* | (2006.01) |

(52) U.S. Cl.
CPC .............. *A23B 2/001* (2025.01); *A47B 77/08* (2013.01); *B65D 81/2038* (2013.01)

(58) Field of Classification Search
CPC .. B65B 31/04; B65D 81/2007; B65D 81/2038
See application file for complete search history.

(56) References Cited

U.S. PATENT DOCUMENTS

| | | | | | |
|---|---|---|---|---|---|
| 5,271,240 | A | * | 12/1993 | Detrick | F25D 17/042 62/331 |
| 6,148,875 | A | * | 11/2000 | Breen | F25D 17/042 141/192 |
| 6,725,632 | B2 | * | 4/2004 | Glucksman | B65B 31/028 251/251 |
| 7,040,356 | B2 | * | 5/2006 | Tarlow | B65D 81/18 141/65 |
| 7,331,163 | B2 | | 2/2008 | Hau et al. | |
| 7,395,755 | B1 | * | 7/2008 | Deese | B29B 17/0052 53/434 |
| 7,677,165 | B2 | * | 3/2010 | Adams | A47J 47/10 99/476 |

| | | | | | |
|---|---|---|---|---|---|
| 8,281,606 | B2 | * | 10/2012 | Vonderhaar | F25D 17/042 62/100 |
| 8,979,621 | B2 | * | 3/2015 | Kelly | E05B 65/46 700/275 |
| 9,296,543 | B2 | | 3/2016 | Wooldridge et al. | |
| 10,383,348 | B2 | * | 8/2019 | Bocks | B65B 31/024 |
| 2014/0034655 | A1 | | 2/2014 | Wooldridge et al. | |
| 2015/0216221 | A1 | | 8/2015 | Doman | |
| 2015/0266598 | A1 | | 9/2015 | Mowry | |
| 2016/0280406 | A1 | | 9/2016 | Chierchia et al. | |
| 2018/0155073 | A1 | | 6/2018 | Torre | |
| 2019/0281866 | A1 | | 9/2019 | Spelt et al. | |
| 2021/0188600 | A1 | | 6/2021 | Freitag et al. | |
| 2023/0038053 | A1 | | 2/2023 | Fei et al. | |

FOREIGN PATENT DOCUMENTS

| | | | | |
|---|---|---|---|---|
| CN | 114476314 | * | 5/2022 | B65D 81/05 |

* cited by examiner

*Primary Examiner* — Timothy L Maust
(74) *Attorney, Agent, or Firm* — Gugliotta & Gugliotta LPA

(57) ABSTRACT

A food vacuum sealing cabinet provides a system for storing multiple food items in a common vacuum environment to maintain freshness. The cabinet resembles a standard kitchen cabinet but incorporates vacuum technology to create vacuum conditions inside the cabinet when sealed. A vacuum pump, control circuit, and valve system allow users to create vacuum storage conditions with simple button controls and to release the vacuum when access to stored items is needed. The cabinet features connections for vacuum jar and bag attachments, providing multi-functionality beyond cabinet storage. This system eliminates the need for individual vacuum bags or containers while extending the shelf life of dry goods and preventing spoilage.

6 Claims, 4 Drawing Sheets

FOOD VACUUM SEALING CABINET

CROSS-REFERENCE TO RELATED APPLICATIONS

There are no previously filed, nor currently any co-pending applications, anywhere in the world.

BACKGROUND OF THE INVENTION

1. Field of the Invention

The present invention relates generally to food preservation systems and, more specifically, to a vacuum-sealing cabinet designed to integrate with standard kitchen cabinetry that creates a vacuum environment for multiple food items simultaneously without requiring individual containers or bags while also providing attachments for traditional vacuum sealing functions.

2. Description of the Related Art

Food preservation has long presented challenges for household consumers. When food items are exposed to air, oxidation processes accelerate spoilage, degradation of flavor, and loss of nutritional value. Moisture absorption from air causes crackers, chips, and cereals to become stale, while sugar and similar products harden upon exposure to humidity. Spices and herbs lose potency when repeatedly exposed to air, and many dry goods attract insects or develop mold under improper storage conditions.

Conventional food storage solutions have relied upon various container types, including plastic, glass, or metal vessels with sealing lids to create barriers against environmental exposure. These solutions provide limited effectiveness as the containers still retain air inside, and the seals often degrade with repeated use, allowing air infiltration.

Vacuum sealing technology emerged as a significant advancement in food preservation. By removing air from storage environments, vacuum sealing substantially reduces oxidation processes and inhibits microbial growth that requires oxygen. Commercial vacuum sealing systems for home use have predominantly followed two approaches: vacuum bag sealers and vacuum jar attachments.

Vacuum bag sealers require specialized plastic bags that must be purchased continuously, creating ongoing expense and environmental concerns regarding single-use plastics. These systems necessitate that each food item be sealed in individual bags, a time-consuming process, particularly for items accessed frequently. Resealing partially used products requires new bags, generating additional waste and expense.

Vacuum jar systems limit storage to compatible jar types and sizes, excluding many common food items and larger quantities. Standalone vacuum appliances occupy valuable counter space in kitchens, while under-counter or drawer models sacrifice storage capacity for the vacuum mechanism.

The existing solutions present several persistent problems: storage inefficiency, with numerous individual containers requiring substantial space; operational inconvenience in repeatedly sealing and unsealing multiple containers; ongoing costs for replacement bags and containers; time-intensive processes for properly storing multiple food items; limited capacity for storing larger quantities or bulkier items; space consumption by standalone appliances in already constrained kitchen environments; and environmental impact of disposable vacuum bags.

These limitations reveal a significant need for a comprehensive vacuum storage solution that eliminates individual packaging requirements, reduces the labor of food preservation, conserves kitchen space, and provides greater capacity for storing various food items without ongoing material expenses.

SUMMARY OF THE INVENTION

It is thus a primary object of the present invention to provide a comprehensive food vacuum preservation system integrated into conventional kitchen cabinetry that extends the shelf life of multiple food items simultaneously without requiring individual vacuum bags or containers, while conserving kitchen space and reducing the time and cost associated with traditional vacuum sealing methods.

It is a feature of the resent invention to provide a standard-sized kitchen cabinet that creates a vacuum environment for simultaneously preserving multiple food items in their original packaging without requiring individual vacuum bags or containers, while also providing attachments for traditional vacuum sealing functions.

The present invention, a food vacuum sealing cabinet, provides a system for storing multiple food items in a common vacuum environment to maintain freshness and extend shelf life. The invention comprises a cabinet housing similar in size to a standard upper kitchen cabinet with a door mounted on hinges. The cabinet housing is constructed of airtight material and includes multiple shelves for storing food items. An airtight gasket seals the door when closed, enabling the creation of vacuum conditions inside.

The cabinet incorporates an equipment enclosure housing a vacuum pump, control circuit, power supply, and valving system to create and release vacuum conditions. A control panel with activation and release buttons allows users to operate the system, while a selector switch directs vacuum to either the main cabinet or to attached accessories for vacuum-sealing jars or bags.

It is an advantage of the present invention to provide a complete vacuum environment for multiple food items without requiring individual vacuum bags or containers.

It is another advantage of the present invention to extend the shelf life of dry goods such as cereals, crackers, chips, spices, and baking ingredients by storing them in a common vacuum environment.

It is an advantage of the present invention to eliminate the recurring costs associated with disposable vacuum sealer bags.

It is another advantage of the present invention to save valuable kitchen counter space by integrating vacuum sealing technology directly into existing cabinetry.

It is an advantage of the present invention to simplify food preservation by enabling users to place multiple items on shelves and create a vacuum with a single button press.

It is another advantage of the present invention to provide multi-functionality through attachments compatible with both vacuum jar sealing and traditional vacuum bag sealing.

It is an advantage of the present invention to reduce food waste by maintaining freshness of previously opened food packages for extended periods.

It is another advantage of the present invention to prevent sugar products from hardening and spices from clumping through vacuum storage.

It is an advantage of the present invention to allow rapid access to stored items through a simple vacuum release mechanism without damaging food containers.

It is another advantage of the present invention to provide a vacuum sealing solution that can be installed in multiple cabinets throughout a kitchen.

It is an advantage of the present invention to maintain the aesthetic appearance of kitchen cabinetry while incorporating advanced preservation technology.

It is another advantage of the present invention to decrease the time required for properly storing multiple food items compared to individual vacuum sealing processes.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
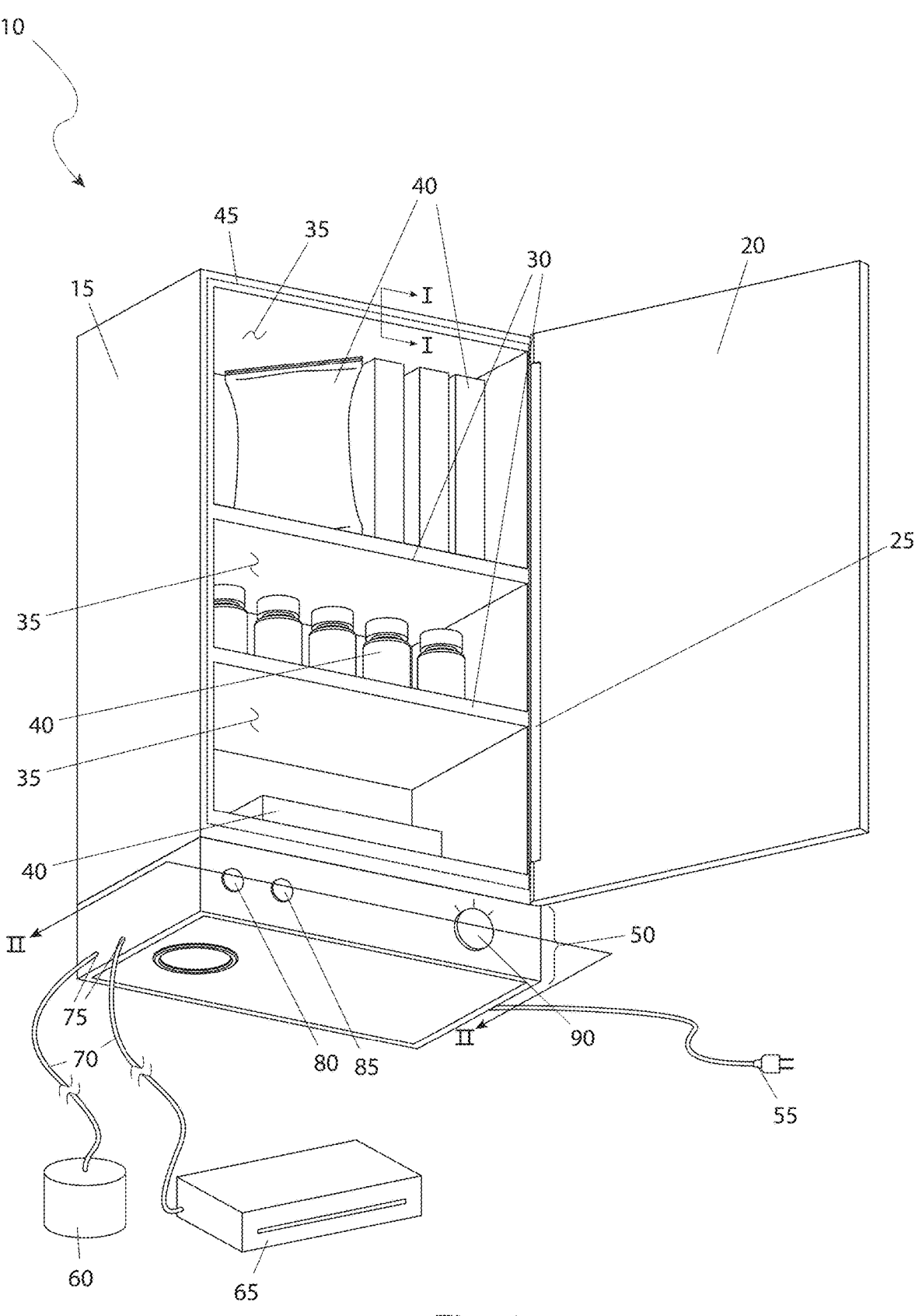
FIG. 1 is a perspective view of a food vacuum sealing cabinet 10, according to the preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a food vacuum sealing cabinet, generally noted as 10, is shown according to the preferred embodiment of the present invention is disclosed. The food vacuum sealing cabinet (herein also described as the "cabinet") 10, provides for a large cabinet for storing multiple different containers or packages of food under a common vacuum to maintain freshness. The cabinet 10 includes a cabinet housing 15 complete with a door 20 mounted on hinges 25. The cabinet housing 15 is approximately the same size as an upper kitchen cabinet and can be wall mounted in a similar manner to a conventional kitchen wall cabinet. However, it is noted that the cabinet 10 may be mounted in a wide variety of locations such as counter-mounted, table-mounted, stand-mounted, or the like. As such, the overall size and mounting location of the cabinet 10 should not be interpreted as a limiting factor of the present invention. The cabinet housing 15 is provided with multiple shelves 30 that provide multiple storage compartments 35.

During use of the cabinet 10, the storage compartments 35 would be used to store a wide variety of food items 40 such as dried beans, rice, pasta, flour, sugar, coffee beans, tea leaves, nuts, seeds, dried fruits, oats, powdered milk, spices, herbs, baking powder, cocoa powder, instant coffee, lentils, *quinoa*, popcorn kernels, crackers, granola, chips, cereal, jerky, powdered drink mixes, dehydrated vegetables, freeze-dried fruits, chocolate, energy bars, trail mix, cookies, bread, and the like. During operation of the cabinet 10, with the door 20 closed, and sealed with the aid of an airtight gasket 45, the storage compartments 35 are placed under a vacuum condition with the aid of components contained within an equipment enclosure 50 at the bottom of the cabinet housing 15. The cabinet 10 is provided with electrical power via a power cord 55 which is connected to a source of electrical power such as an electrical receptacle. Further detail in the equipment enclosure 50 and the power cord 55 will be provided herein below.

To further facilitate vacuum storage of various food products, the cabinet 10 is provided with two (2) accessory modules. A vacuum jar storage attachment 60 is used to produce a vacuum in food storage jars such as canning jars. A vacuum bag storage attachment 65 is used to vacuum store food in bags such as meat freezer bags, chip bags, and the like. Both the vacuum jar storage attachment 60 and the vacuum bag storage attachment 65 are connected to the equipment enclosure 50 by sections of vacuum tubing 70 through a vacuum connector 75. The vacuum connector 75 allows the user to remove the vacuum tubing 70 along with the vacuum jar storage attachment 60 and vacuum bag storage attachment 65 when not in use. The equipment enclosure 50 is provided with a activate pushbutton 80, a release pushbutton 85 and a selector switch 90. The selector switch 90 allows the user to select vacuum delivery to the cabinet housing 15, to select the vacuum jar storage attachment 60, or to select the vacuum bag storage attachment 65. The activate pushbutton 80 is used to produce a vacuum in either the cabinet housing 15, in the vacuum jar storage attachment 60, or in the vacuum bag storage attachment 65, dependent on the position of the selector switch 90, and the release pushbutton 85 is used to release the vacuum in the cabinet housing 15 when the user wishes to open the door 20.

Figure 2:
FIG. 2 is a sectional view of the food vacuum sealing cabinet 10, as seen along a line I-I, as shown in FIG. 1, according to the preferred embodiment of the present invention.
Figure 2:
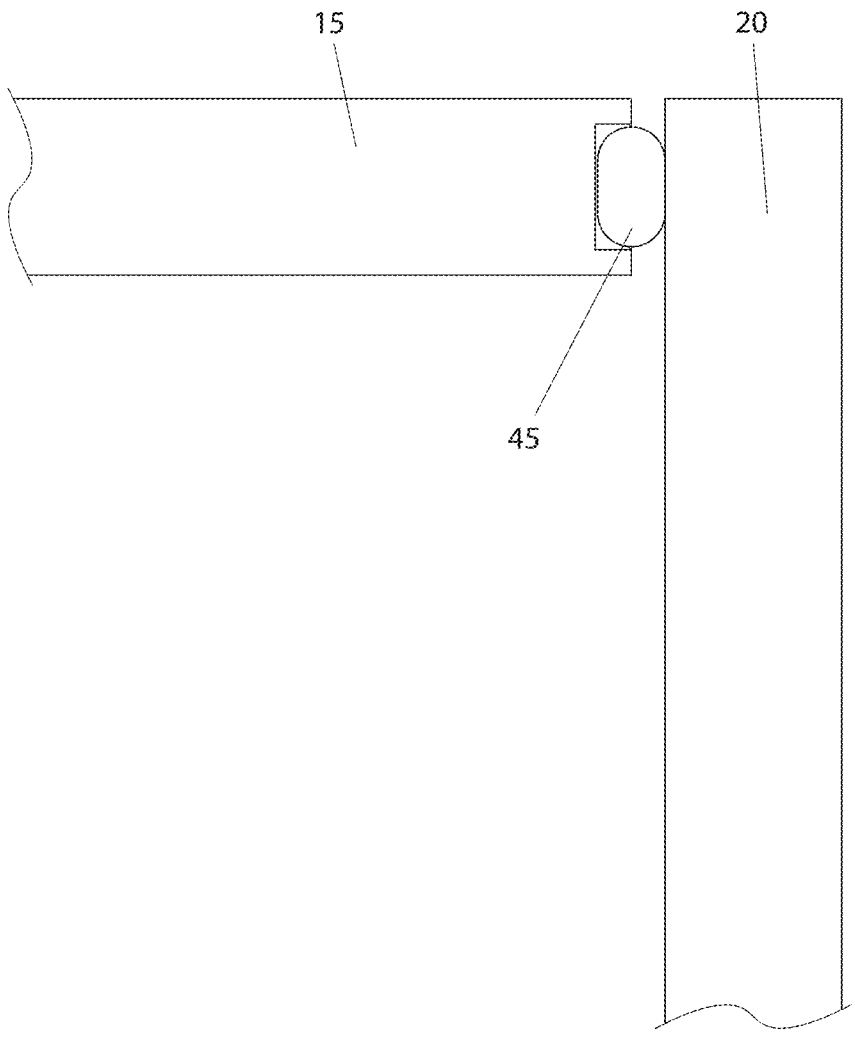

Referring next to FIG. 2, a sectional view of the cabinet 10, as seen along a line I-I, as shown in FIG. 1, according to the preferred embodiment of the present invention is depicted. Said view provides further clarification of the configuration between the cabinet housing 15, the door 20 and the airtight gasket 45. The airtight gasket 45 is envisioned to be made of a material such as a rubber compound that is compressible under force to aid in maintaining a negative pressure inside of the storage compartments 35 (as shown in FIG. 1).

Figure 3:
FIG. 3 is a sectional view of the food vacuum sealing cabinet 10, as seen along a line II-II, as shown in FIG. 1, according to the preferred embodiment of the present invention; and, FIG. 4 is an electrical block diagram of the food vacuum sealing cabinet 10, according to the preferred embodiment of the present invention.
Figure 3:
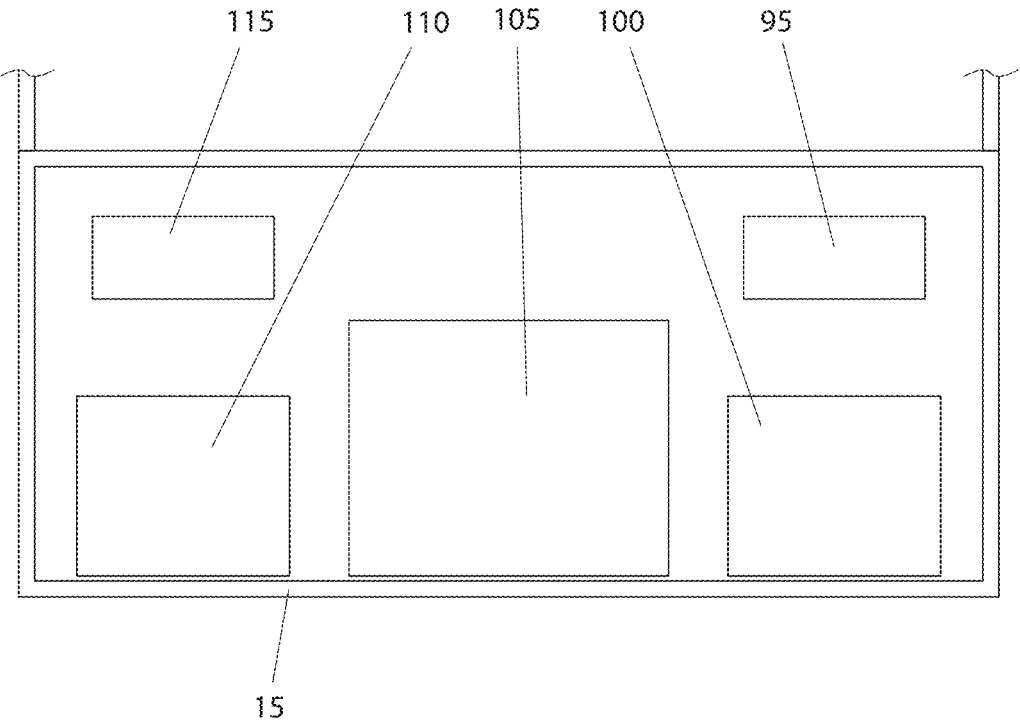

Referring now to FIG. 3, a sectional view of the cabinet 10, as seen along a line II-II, as shown in FIG. 1, according to the preferred embodiment of the present invention is shown. Said view discloses the internal components inside the equipment enclosure 50. Incoming electrical power from the power cord 55 (as shown in FIG. 1) is routed to a power supply 95. A control circuit 100 provides internal logic to control various components and allow for timer functions, prevention of out of parameter operation, and the like. A vacuum pump 105 produces the vacuum used in the cabinet housing 15, the vacuum jar storage attachment 60 and the vacuum bag storage attachment 65 (all of which are shown in FIG. 1). A three-way solenoid valve 110 directs the vacuum produced by the vacuum pump 105 to the cabinet housing 15, the vacuum jar storage attachment 60 and the vacuum bag storage attachment 65. A solenoid valve 115 releases the vacuum allowing the door 20 be opened on the cabinet housing 15 (both of which are as shown in FIG. 1) when the release pushbutton 85 (as shown in FIG. 1) is pressed.

Figure 4:
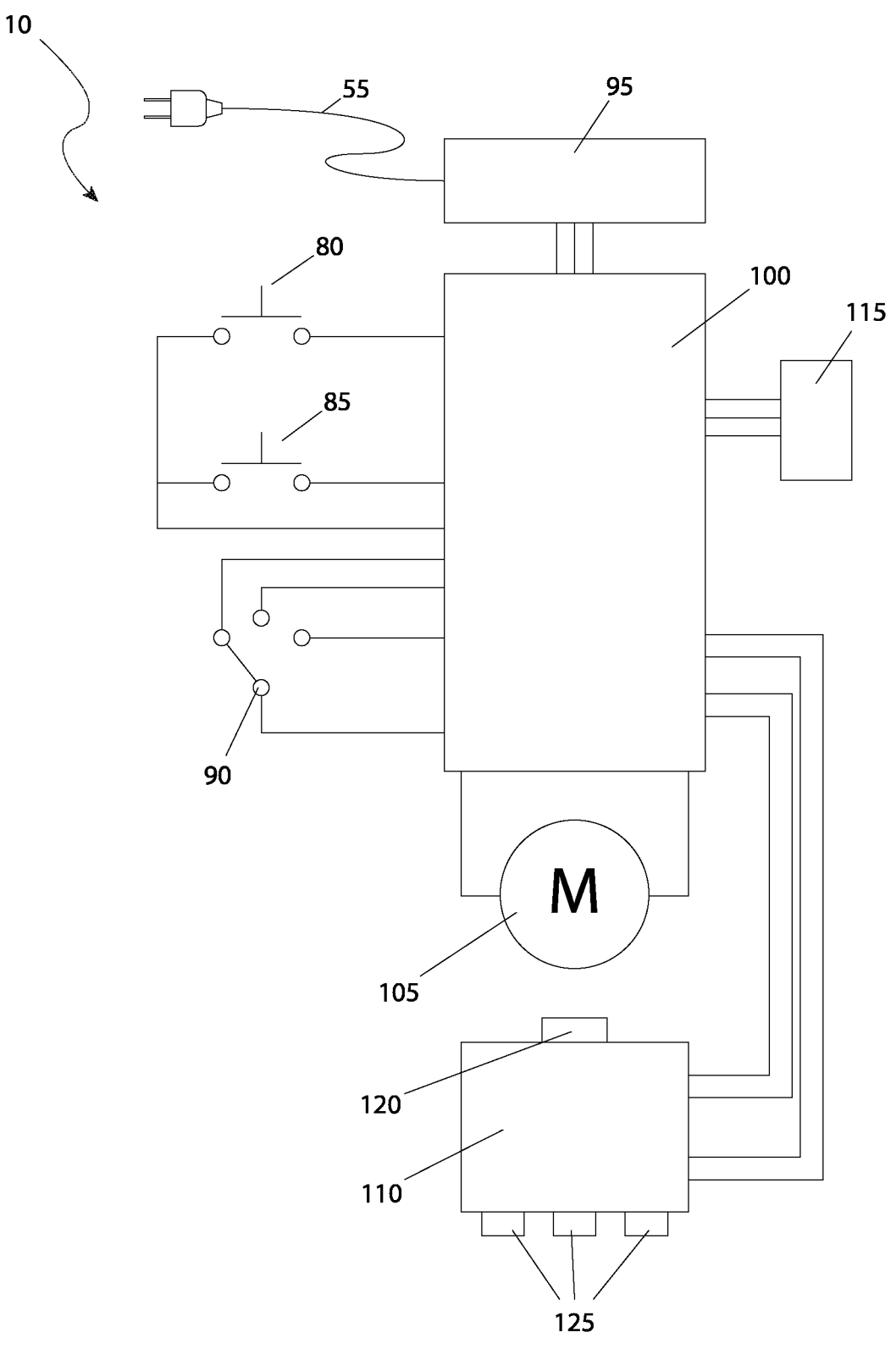

Referring to FIG. 4, an electrical block diagram of the cabinet 10, according to the preferred embodiment of the present invention, is disclosed. Incoming power from the power cord 55 is routed to the power supply 95 which regulates and adjusts voltage levels required by various downstream electrical components. Resultant power is then passed through to the control circuit 100 which is envisioned to be a Single Board Computer (SPC), such as a RaspberryPi®, Arduino®, or the like. The three-way solenoid valve 110 receives inputs from the activate pushbutton 80, the release pushbutton 85, and the selector switch 90 directing basic operation of the cabinet 10. Outputs from the control circuit 100 to control operation of the vacuum pump 105 with regards to on/off operation. The three-way solenoid valve 110 directs a single vacuum input connection 120 into one of three (3) vacuum output connections 125, based upon settings of the selector switch 90. In order to release the vacuum inside of the cabinet housing 15 (as shown in FIG. 1), the solenoid valve 115 releases the vacuum when the release pushbutton 85 is pressed as controlled by the control circuit 100.

2. Operation of the Preferred Embodiment

The preferred embodiment of the present invention can be utilized by the common user in a simple and effortless manner with little or no training. It is envisioned that the cabinet 10 would be constructed in general accordance with FIG. 1 through FIG. 4. The user would procure the cabinet 10 from conventional procurement channels such as hardware stores, home improvement stores, discount stores, department stores, appliance retailers, mail order and internet supply houses and the like. Special attention would be paid to the overall size of the invention such that it meets its intended use.

After procurement and prior to utilization, the cabinet 10 would be placed in a suitable location for use, such as in a kitchen in its most probable usage scenario. It may be wall-mounted like a common kitchen wall cabinet, or placed upon a counter, tabletop or the like. The power cord 55 would be connected to a suitable source of electrical power such as a receptacle. At this point in time, the cabinet 10 is ready for use.

During utilization, the initial usage scenario would see the user placing desired food items 40 into the storage compartments 35, on the shelves 30 of the cabinet housing 15. Such food items 40 would benefit from vacuum benefit conditions. Next, the door 20 would be closed against the airtight gasket 45 and the activate pushbutton 80 pressed. The vacuum pump 105 would run thus producing a vacuum through the three-way solenoid valve 110, and automatically stop once a satisfactory vacuum level is reached. At this point in time, the cabinet 10 stores the food items 40 until needed again. When access to the food items 40 is desired, the user presses the release pushbutton 85 to release the vacuum through the solenoid valve 115. This allows the user to open the door 20 and retrieve the desired food items 40.

Should usage of the cabinet 10 be desired with jars or bags, the selector switch 90 would be placed into the respective position, the vacuum tubing 70 connected between the vacuum connector 75 and either into the respective vacuum jar storage attachment 60 or vacuum bag storage attachment 65. Once again the activate pushbutton 80 would be pressed to generate an appropriate vacuum level in the jar or bag.

The above usage process would continue in a repeating and cyclical manner to ensure maximum freshness in stored, previously opened food items 40.

The features of the present invention are envisioned to provide the ability to vacuum seal food items 40 without having to place everything into individual bags or containers; to enable food items 40 stored in the invention to stay fresh three to five times (3-5x) longer than food items 40 not stored in the invention; to provide the ability to save money by not having to discard spoiled food items 40; to prevent food items 40 like sugar products from becoming hard; and, to prevent food items 40 like spices from clumping up and becoming unusable.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A food vacuum sealing cabinet comprising:
a cabinet housing similar in size to a standard kitchen cabinet;
a door mounted on hinges attached to said cabinet housing;
an airtight gasket positioned between said door and said cabinet housing; at least one shelf positioned within said cabinet housing forming at least one storage compartment;
a vacuum generation system comprising:
a vacuum pump;
a control circuit connected to said vacuum pump;
a power supply connected to said control circuit;
at least one control input for activating and deactivating said vacuum pump; and
at least one solenoid valve to release vacuum from said cabinet housing;
wherein said cabinet housing, said door, and said airtight gasket form an airtight enclosure when said door is closed; and
wherein said vacuum pump is configured to remove air from said airtight enclosure to create vacuum storage conditions for food items placed within said at least one storage compartment; and
wherein said cabinet housing is configured to operate at ambient room temperature without any refrigeration or cooling mechanism; and
wherein said cabinet housing is configured to maintain food items exclusively through vacuum preservation at ambient room temperature, including a vacuum connector port accessible from outside said cabinet housing and configured for detachable connection, vacuum tubing connected to said vacuum connector port, and at least one vacuum attachment device selected from the group consisting of a vacuum jar storage attachment and a vacuum bag storage attachment, said at least one vacuum attachment device being selectively connectable to said vacuum tubing; and
further comprising a selector switch configured to direct vacuum from said vacuum pump selectively to either said cabinet housing, said at least one vacuum attachment device, or neither said cabinet housing nor said at least one vacuum attachment device; and
a three-way solenoid valve connected to said vacuum pump, said cabinet housing, and at least one vacuum output connection, wherein said three-way solenoid valve is configured to selectively direct vacuum from said vacuum pump to either said cabinet housing for creating vacuum storage conditions for multiple food items simultaneously or to said at least one vacuum output connection for vacuum sealing operations external to said cabinet housing.

2. The food vacuum sealing cabinet of claim 1, wherein at least one vacuum attachment device comprises a vacuum jar storage attachment configured to create vacuum conditions in food storage jars, and wherein said selector switch is configured to direct vacuum from said vacuum pump selectively to either said cabinet housing or said vacuum jar storage attachment.

3. The food vacuum sealing cabinet of claim 1, further comprising a selector switch configured to direct vacuum from said vacuum pump selectively to either said cabinet housing or said at least one vacuum attachment device, wherein said at least one vacuum attachment device comprises a vacuum storage attachment configured to create vacuum conditions in food storage bags, wherein said vacuum bag storage attachment remains connected to said vacuum tubing during vacuum bag sealing operations.

4. The food vacuum sealing cabinet of claim 1, wherein said at least one vacuum attachment device comprises both a vacuum jar storage attachment configured to create vacuum conditions in food storage jars and a vacuum bag storage attachment configured to create vacuum conditions in food storage bags, wherein said vacuum bag storage attachment remains connected to said vacuum tubing during vacuum bag sealing operations, and wherein said selector switch is further configured to direct vacuum from said vacuum pump selectively to said cabinet housing, said vacuum jar storage attachment, or said vacuum bag storage attachment.

5. The food vacuum sealing cabinet of claim 1, further comprising a pressure sensor configured to monitor vacuum pressure within said cabinet housing and provide feedback to said control circuit, wherein said control circuit is configured to automatically control said vacuum pump based on pressure readings from said pressure sensor to maintain a target vacuum level within said airtight enclosure.

6. The food vacuum sealing cabinet of claim 1, wherein said three-way solenoid valve receives a single vacuum input connection from said vacuum pump and distributes vacuum to one of three vacuum output connections based on a position of said selector switch, said three vacuum output connections comprising a first output to said cabinet housing, a second output to said vacuum jar storage attachment, and a third output to said vacuum bag storage attachment.

* * * * *